July 4, 1967     R. L. GEASLEN ET AL     3,329,343

MULTIPLE UNIT HEATING SYSTEM

Filed Oct. 22, 1964     2 Sheets-Sheet 1

Inventors:
Russell L. Geaslen
Chester E. Tomlin
By Hofgren, Wegner,
Allen, Stellman & McCord   Attys

United States Patent Office 3,329,343
Patented July 4, 1967

3,329,343
MULTIPLE UNIT HEATING SYSTEM
Russell L. Geaslen, Chicago, and Chester E. Tomlin, Niles, Ill., assignors to Triad Sales Corporation, a corporation of Illinois
Filed Oct. 22, 1964, Ser. No. 405,710
11 Claims. (Cl. 237—8)

This invention relates in general to a heating system, and more particularly to a new and improved system for controlling the operation of a plurality of heating units for heating the interior of a building.

Heretofore, it has been conventional to employ a single heating device, such as a boiler, for heating the interior of a building. Because of the widely divergent outdoor temperature conditions prevalent in certain areas during different parts of the year, it has been conventional to provide a single, relatively large capacity heating unit to insure that the heating unit will have a sufficient output during cold weather to satisfy the maximum anticipated heating load. As can be readily appreciated, when only a single heating unit is provided, a vast majority of time the heating unit is operated at much less than its maximum capacity. When large capacity heating units are operated at less than their maximum capacity, an inefficient operation is produced wherein a large amount of fuel is consumed in proportion to the heat output of the unit. Another disadvantage inherent in a heating system employing only a single unit is the lack of protection against interruption of heating service if the single unit fails for one reason or another.

A further, and perhaps the largest, disadvantage of heating systems employing only a single heating unit is the necessity to continuously cycle the heating unit on and off in response to the demands of the heating load. Since heaters usually operate at maximum efficiency when they are in use continuously, the constant cycling of the heater in a single heating unit system is obviously an inefficient mode of operation.

Accordingly, the purpose of the present invention is to provide a heating system which obviates the problems and disadvantages noted above in connection with a heating system employing a single heating unit, while still being relatively low in cost to manufacture, install and maintain.

An object of the invention is to provide a heating system which will provide the exact amount of heat required to satisfy the heat load.

Another object of the invention is to provide a highly efficient heating system employing a plurality of heating units which are operated at maximum efficiency.

A related object is the provision of a heating system wherein the heating units require a minimum amount of fuel.

A further object of the invention is to provide a heating system with built-in protection against interruption of heating service.

Still another object of the invention is to provide a heating system with a plurality of heating units wherein several of the heating units are operated continuously, and only one of the units is cycled.

A still further object of the invention is to provide a heating system as described in the preceding paragraph with means for equalizing use between each of the heating units.

And a still further object of the invention is to provide a heating system wherein all of the heat transfer takes place in a secondary flow circuit through the individual heating units, and no substantial heat transfer takes place in a primary flow circuit to the heating load.

These and other objects of the invention will hereinafter become more fully apparent from the following description taken in connection with the annexed drawing wherein.

Figure 1:
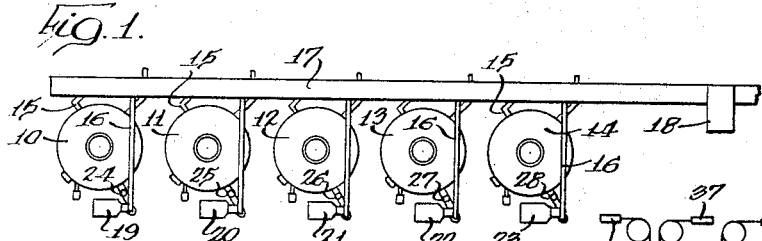
FIG. 1 is a top plan view of a preferred arrangement of heating units.

While this invention is susceptible of embodiment in many different forms, there is shown in the drawing and will herein be described in detail one specific embodiment, with the understanding that the present disclosure is to be considered as an exemplification of the principles of the invention and is not intended to limit the invention to the embodiments illustrated. The scope of the invention will be pointed out in the appended claims.

Figure 2:
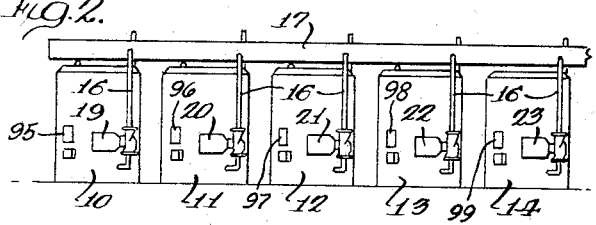
FIG. 2 is a front elevational view of the apparatus illustrated in FIG. 1.
Figure 3:
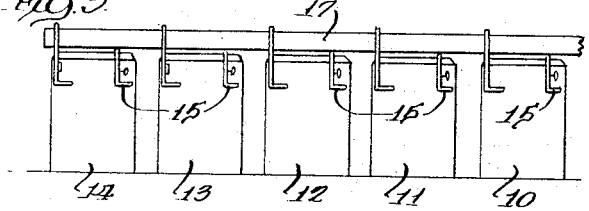
FIG. 3 is a rear elevational view of the apparatus illustrated in FIGS. 1 and 2.

Referring now to the drawing, wherein like reference characters designate like or corresponding parts throughout the several views, five heating units, 10–15, are illustrated in side-by-side relationship in FIGS. 1–3. Each of the illustrated heating units is a hot water boiler, and the units may be fired by gas, oil, electricity, solar energy, or solid fuels such as coal or wood. Each of the units is substantially identical so that only one unit will be described in detail. It will be understood, of course, that the number of heating units to be used in the present system depends upon the magnitude of the anticipated heating load and the capacity of the individual units, and five heating units have been illustrated in the drawings for purposes of example only.

Each of the boilers has an inlet line 15 and an outlet line 16 communicating with a conduit 17. Conduit 17 is connected to a heat load, such as a plurality of convecting devices, in the building to be heated. Circulating means in the form of a pump 18 is provided in conduit 17 to force the flow of water in conduit 17 to the heating load and back through conduit 17 to the boilers 10–14. It will be understood, of course, that the pump 18 may be provided at either the supply or the return side of the conduit 17.

Suitable flow control valves 24–28 are connected in the respective outlet lines 16 of the boilers 10–14 to control the flow of water through each of the individual units. Secondary circulating means in the form of pumps 19–23 are associated with the outlet lines 16 of the respective units 10–14. As will hereinafter be explained in detail, pumps 19–23, and the heating means (not shown) for each of the units, are operatively responsive to the attainment of a predetermined outside temperature. The valves 24–28 are opened in response to the actuation of pumps 19–23, and thus there is no flow of water through any of the units until a predetermined outside temperature is reached. Accordingly when the predetermined outside temperature is reached, the respective secondary circulator will be actuated, and water will flow into the responsive boiler through the inlet line 15 where it will be heated, and thence outwardly from the respective boiler through the outlet line 16 into the conduit 17. From the foregoing it will be apparent that if the outside temperature conditions do not dictate that each of boilers 11–14 be operated concurrently, the hot water is not circulated through the cold inoperative boilers.

In use, the boilers 10–14 will have a combined total heat output in excess of the maximum anticipated heat load. However, each of boilers 10–14 has an individual heating capacity less than the maximum anticipated heat load. Thus, it may be necessary to operate each of the units together on an extremely cold day, whereas on a warmer day less than all of the units will be operated. Under certain conditions, a number of the units will be operated substantially continuously, while only one of the units will be cycling to retain the indoor temperature at the desired level. The means for controlling the units in this fashion will be set forth hereinafter. It will be readily appreciated that since a certain number of the units are operated substantially continuously under certain conditions, and since only one unit is cycling, a highly efficient system is produced.

Figure 4:
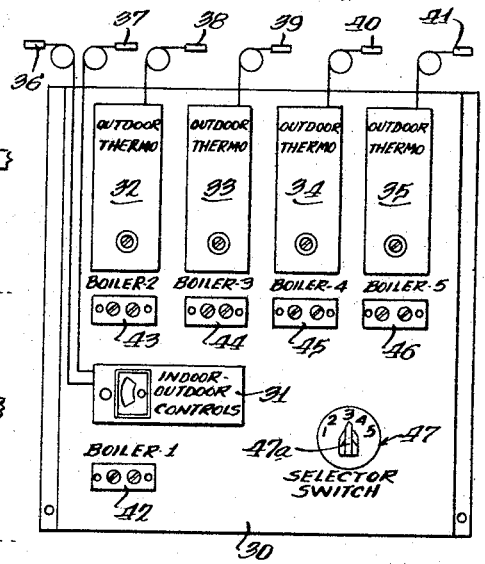
FIG. 4 is an enlarged front elevational view of a control panel for the apparatus shown in FIGS. 1-3, and FIGS. 5 and 5a are schematic wiring diagrams for the apparatus shown in FIGS. 1-4.
Figure 5:
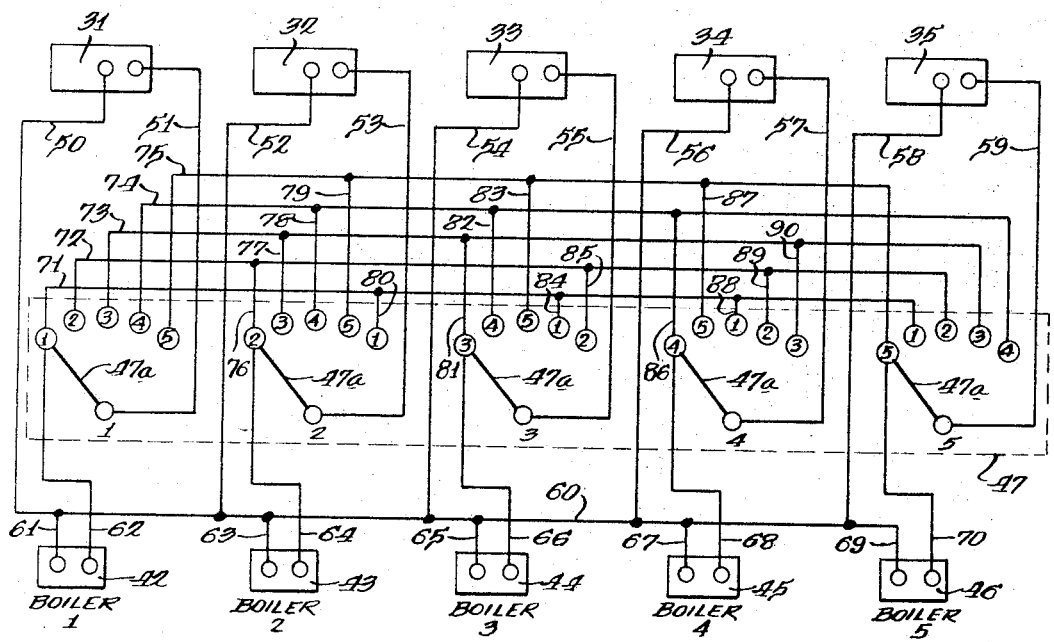

The means for controlling the operation of the boilers will be best understood from a consideration of FIGS. 4 and 5, wherein a control panel is shown at 30 in FIG. 4. An indoor-outdoor control device 31 is mounted on control panel 30, as are outdoor thermostats 32–35. The indoor-outdoor control 31 includes an inside bulb 36, which is operatively responsive to the temperature of the water flowing through conduit 17. Control 31 further includes an outside bulb 37 which is responsive to the outside temperature. Each of the thermostats 32–35 is provided with a respective bulb 38–41, which is adapted to be positioned outdoors so as to be responsive to outside temperature. Each of controls 31–35 is adjustable, and each will be set a predetermined temperature level, as will hereinafter become more fully apparent.

Thermostats 32–35 may conveniently be a "Type 231 Fuel Changing Control" available from the White-Rogers Co., St. Louis, Mo., or a thermostat equivalent thereto; and the indoor-outdoor control 31 may be a "Type 1050 or 1051 Indoor-Outdoor Temperature Control," also available from the White-Rogers Co., or a control equivalent thereto. Controls 31–35 are adjustable thermostatic devices which may be connected in electrical circuits and function as open switches until the temperature which has been selected for any device is reached, at which point the switch closes to complete the circuit and create a signal.

Figure 5A:
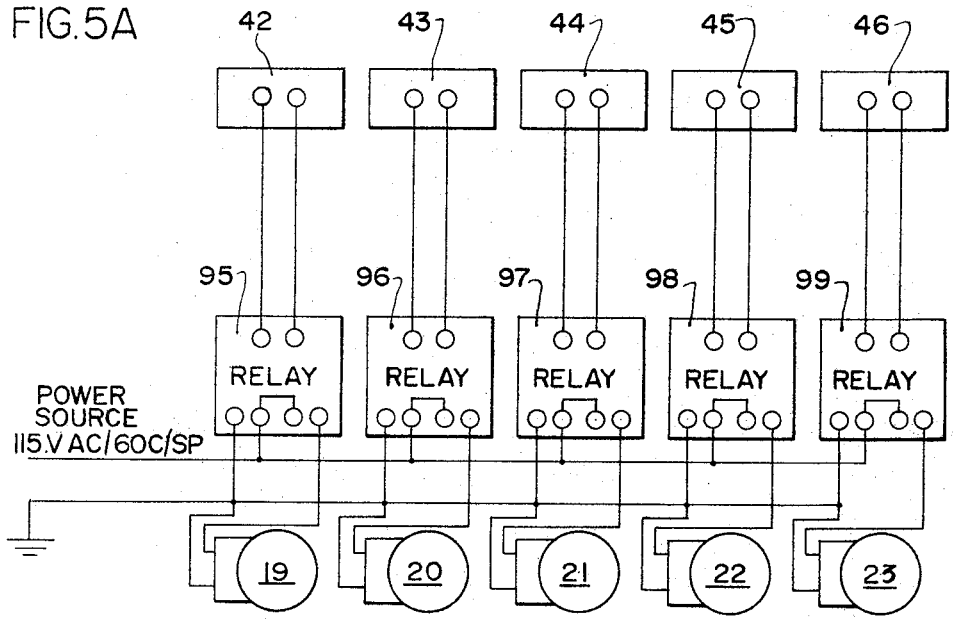

Terminal blocks 42–46 are also provided on the control panel 30, and suitable electrical conductors (FIG. 5A) extend from the terminal blocks 42–46 to the respective motors of the pumps 19–23 of boilers 10–14. The pump motors are connected to a suitable power source through conventional control means, such as relays 95–99. Obviously, control means for actuating the heating means of the respective boilers may be operatively responsive to the energization of relays 95–99, so that the signal for energizing the pumps will also operate the heating means in response to the attainment of a predetermined outside temperature. A selector switch 47 is also provided on the control panel 30, and includes a manually operable selector arm 47a for selecting one of a plurality of modes of operation, as will hereinafter appear.

Each of controls 31–35 includes respective pairs of leads 50–51, 52–53, 54–55, 56–57, and 58–59. Leads 50, 52, 54, 56 and 58 are connected to a line 60, while leads 51, 53, 55, 57 and 59 are connected to the selector arm or rotor 47a of switch 47. A pair of lines 61–62, 63–64, 65–66, 67–68, and 69–70 extend from respective boiler terminals 42–46, with lines 61, 63, 65, 67 and 69 being connected to line 60, and with lines 62, 64, 66, 68 and 70 being connected to the selector switch 47 as is shown in FIG. 5.

Assuming that the movable control arm 47a of the selector switch 47 is in the position shown in FIG. 5 (which will be referred to hereinafter as the first position), a circuit will be complete from the indoor-outdoor control 31 to the boiler No. 1 through lead 50 and line 61, and through lead 51, switch arm 47a, and line 62. A circuit will be complete from thermostat 32 to boiler No. 2 through lead 52 and line 63, and lead 53, switch arm 47a and line 64. In a like manner thermostats 33–35 are connected in circuit with boilers No. 3, 4 and 5 respectively. The indoor-outdoor control 31 is adjusted to a preselected temperature, so that the outside bulk 37 thereof will cause boiler No. 1 to be operated when the outside temperature drops to the preselected value. Assuming that boilers 10–14 are boilers No. 1–No. 5 respectively. when the outside temperature drops to the level for which outside bulb 37 is set, the burner for boiler 10 will be started, the pump 19 will be actuated to open the flow control valve 24, and the pump 19 will circulate water from conduit 17 through boiler 10 and out through line 16 back into the conduit 17. Pump 18 may be made operatively responsive to indoor-outdoor control 31, if desired, so the circulation of water to the heating load will be initiated when the outside temperature drops to the preset level sensed by outside bulb 37. Indoor-outdoor control 31 is also set to a preselected temperature level so that when the temperature of the water flowing through conduit 17 sensed by inside bulb 36 rises above the level selected for bulb 36 the operation of boiler 10 is discontinued. Thus, the inside bulb 36 functions to cycle the boiler 10 on and off in response to the temperature of the water in conduit 17 fluctuating above and below the setting of the inside bulb 36. The thermostat 32 is set so that the bulb 38 is operatively responsive to a lower temperature than the setting of bulb 37 of indoor-outdoor control 31. Thus, when the outside temperature drops below the setting for bulb 38, the boiler 11 will be actuated. As long as the outside temperature is below the setting for bulb 38, the boiler 11 will be actuated. As long as the outside temperature is below the setting for bulb 38, boiler 11 will be operated continuously while boiler 10 cycles on and off in response to the temperature of the water in conduit 17 rising above and dropping below the setting for the inside bulb 36. The thermostat 33 is set so that the bulb 39 is operatively responsive to a temperature lower than the temperature at which the bulb 38 of thermostat 32 is set. Thus, when the outside temperature drops below the temperature at which bulb 39 is set, boiler 12 will be actuated and continuously operated so long as the outside temperature is below the setting for bulb 39. As long as the outside temperature is below the setting of bulb 39, boilers 11 and 12 will be continuously operated, while boiler 10 will cycle to retain the indoor temperature substantially constant. From the foregoing it will be apparent that thermostat 34 is set so that the bulb 40 is operatively responsive to a lower temperature than the setting of bulb 39, while the bulb 41 is set to be operatively responsive to a temperature lower than the setting of bulb 40. Thus, during extremely cold weather, each of the boilers will be operating, but only one of the boilers will be cycling, and this is the boiler which is responsive to the indoor-outdoor control.

It will be readily understood with the system described above, the boiler No. 1, which is responsive to the indoor-outdoor control, will receive the largest amount of use, while boilers No. 2, 3, 4 and 5 will each be used in a diminishing amount. In order to equalize the use of each of the boilers, means are provided to make each of the boilers operatively responsive to the indoor-outdoor control 31. The last named means includes the switch 47, which contains a plurality of positions, corresponding in number to the number of boilers. Switch 47 is a multi-section switch, and in the illustrated embodiment, contains five sections numbered 1–5.

As can be best seen in FIG. 5, a line 71 connects the No. 1 contact in the first position on switch section 1 with the No. 1 contact in the second position on switch section 5. A line 72 connects the No. 2 contact in position No. 2 on switch section 1 with the No. 2 contact in the third position on switch section 5. A line 73 connects the No. 3 contact in the third position on switch section 1 with the No. 3 contact in the fourth position on switch section 5. A line 74 connects the No. 4 contact in the fourth position on switch section 1 with the No. 4 contact in the fifth position on switch section 5. A line 75 connects the No. 5 contact in the fifth position in switch section 1 with the No. 5 contact in the first position in switch section 5. In switch section 2, a line 76 connects the No.

2 contact in the first position with line 72, a line 77 connects the No. 3 contact in the second position with line 73, a line 78 connects the No. 4 contact in the third position with line 74, a line 79 connects the No. 5 contact in the fourth position with line 75, and a line 80 connects the No. 1 contact in the fifth position with line 71. In switch section 3 a line 81 connects the No. 3 contact in the first position with line 73, a line 82 connects the No. 4 contact in the second position with line 74, a line 83 connects the No. 5 contact in the third position with line 75, a line 84 connects No. 1 contact in the fourth position with line 71, and a line 85 connects the No. 2 contact in the fifth position with line 72. In switch section 4 a line 86 connects the No. 4 contact in the first position with line 74, a line 87 connects No. 5 contact in the second position with line 75, a line 88 connects No. 1 contact in the third position with line 71, a line 82 connects the No. 7 contact in the fourth position with line 72, and a line 90 connects the No. 3 contact in the fifth position with line 73.

Thus, when switch selector arm 47a is moved into the second position, boiler No. 2 is responsive to the indoor-outdoor control 31 via lead 51, arm 47a, line 72, line 76 and line 64. Similarly when switch arm 47a is in the second position, boiler No. 1 is responsive to thermostat 35 through lines 62, line 71, switch arm 47a and lead 59. When the switch arm 47a is in the second position, boiler No. 3 is operatively responsive to thermostat 32 by a circuit including line 66, line 81, line 73, line 77, switch arm 47a, and lead 53. Boiler No. 4 is operatively responsive to thermostat 33 by a circuit including line 68, line 86, line 74, line 82, switch arm 47a, and lead 55. Thus, when the switch arm 47a is in the second position, the boiler No. 5 will be the first one to be operated, and boilers No. 1–4 will be operated successively thereafter.

It is also believed evident that when the switch arm 47a is in the third position, boiler No. 3 will be operatively responsive to the indoor-outdoor control 31, and will be operated first, while boilers 4, 5, 1 and 2 will be operated succesively thereafter. In a like manner when the switch arm 47a is in the fourth position, boiler No. 4 will be operatively responsive to the indoor-outdoor control 31 and will be the first to be operated, while boilers 5, 1, 2 and 3 will be operated successively thereafter.

From the foregoing, it should be apparent that by periodically adjusting the selecting arm 47a of the switch 47 the amount of use that each of the boilers receives can be controlled and equalized. It should also be apparent that the aforedescribed system fully achieves each of the objects of the invention.

We claim:

1. A heating system for heating an indoor area comprising: a plurality of boilers, each having a cold water inlet and a hot water outlet, the cold water inlet and hot water outlet of each boiler defining a secondary flow circuit through each respective boiler; a single conduit connecting the cold water inlet and hot water outlet of each of said boilers and defining a primary flow circuit for conveying hot water to the heating load and back to the boilers; pump means for circulating water through said primary flow circuit; pump means associated with each boiler for circulating water through its respective secondary flow circuit; thermostatic control means for operating a sufficient number of said boilers to satisfy an existing heat load; and means for preventing the flow of water through inoperative boilers.

2. A heating system for heating an indoor area comprising: a plurality of boilers, each having a cold water inlet and a hot water outlet; conduit means connecting the hot water outlet of each said boilers and adatped to convey hot water to a heating load; control means for controlling a first of said boilers, said control means having a first adjustable thermostatic device responsive to the outdoor temperature for operating said first boiler when the outdoor temperature reaches a first predetermined level, and a second adjustable thermostatic device responsive to the temperature of water flowing through said conduit means for cycling the first boiler "off" when the temperature of water flowing through said conduit means exceeds a second predetermined level and for cycling said first boiler "on" when the temperature of water flowing through said conduit means drops below said second predetermined level; and an adjustable thermostat control associated with each of the other boilers and responsive to outdoor temperature, each of said adjustable thermostatic controls being preset to operate its respective boiler at a different temperature below said first predetermined level, whereby the outdoor temperature determines the number of boilers to be operated in addition to said first boiler, if any, and each of this number of boilers is operating continuously while the first boiler cycles on and off to retain the indoor temperature substantially constant.

3. A heating system for heating an indoor area comprising: a plurality of boilers, each having a cold water inlet and a hot water outlet, the cold water inlet and hot water outlet of each boiler defining a secondary flow circuit through each respective boiler; a single conduit connecting the cold water inlet and hot water outlet of each of said boilers and defining a primary flow circuit for conveying hot water to a heating load and back to said boilers; means for circulating water through said primary flow circuit; means associated with each boiler for circulating water through its respective secondary flow circuit; means normally preventing flow through each of said secondary flow circuits; control means for controlling a first of said boilers, said control means having a first adjustable thermostatic device responsive to the outdoor temperature for initiating flow through the secondary flow circuit of said first boiler when the outdoor temperature reaches a first predetermined level, and a second adjustable thermostatic device responsive to the temperature of the water flowing through said primary flow circuit for cycling said first boiler by stopping the flow of water through the secondary flow circuit thereof when the temperature of the water in the primary flow circuit exceeds a second predetermined level and for starting the flow of water through the secondary flow circuit thereof when the temperature of the water in the primary flow circuit drops below said second pretetermined level; and an adjustable thermostat control associated with each of the other boilers and responsive to outdoor temperature, each of said adjustable thermostatic controls being preset to initiate flow through the secondary flow circuit of its respective boiler at a different temperature below said first predetermined level, whereby the outdoor temperature determines the number of boilers to be operated in addition to said first boiler, if any, and each of this number of boilers is operating continuously while the first boiler cycles on and off to retain the indoor temperature substantially constant.

4. A heating system for heating an indoor area comprising: a plurality of boilers, each having a maximum capacity insufficient to satisfy the maximum anticipated heat load, the combined capacity of each of said boilers being in excess of the maximum heat load, each of said boilers having a cold water inlet and a hot water outlet, the cold water inlet and hot water outlet of each boiler defining a secondary flow circuit through each respective boiler; a single conduit connecting the cold water water inlet and hot water outlet of each of said boilers and defining a primary flow circuit for conveying hot water to a heating load and back to said boilers; means for circulating water through said primary flow circuit; means associated with each boiler for circulating water through its respective secondary flow circuit; means normally preventing flow through each of said secondary flow circuits; control means for controlling a first of said boilres, said control means having a first adjustable thermostatic device responsive to the outdoor temperature for initiating flow through the secondary flow circuit of said first boiler when the outdoor temperature reaches a first predetermined level, and a second adjustable thermostatic device responsive to the temperature of water flowing through said primary flow circuit for cycling said first boiler by stopping the flow of water through the secondary flow circuit thereof when the temperature of water in said primary flow circuit exceeds a second predetermined level and for starting the flow of water through the secondary flow circuit thereof when the temperature of water in said primary flow circuit drops below said second predetermined level; and an adjustable thermostat control associated with each of the other boilers and responsive to outdoor temperature, each of said adjustable thermostatic controls being preset to initiate flow through the secondary flow circuit of its respective boiler at a different temperature below said first predetermined level, whereby the outdoor temperature determines the number of boilers to be operated in addition to said first boiler, if any, and each of this number of boilers is operating continuously while the first boiler cycles on and off to retain the indoor temperature substantially constant.

5. Temperature changing means comprising: a plurality of temperature changing devices, each having an inlet and an outlet, the inlet and outlet of each device defining a secondary flow circuit through each respective device; conduit means connecting the inlet and outlet of each said device and defining a primary flow circuit for conveying a fluid medium; primary circulating means for circulating fluid medium through said primary flow circuit; secondary circulating means associated with said devices for circulating fluid medium through their respective secondary flow circuits; control means for operating a sufficient number of said devices to satisfy existing requirements; and means for preventing the flow of fluid medium through non-operating devices.

6. Temperature changing means as defined in claim 5 wherein said secondary circulating means includes a secondary circulator for each of said devices.

7. Temperature changing means as defined in claim 5 in which each of said devices is a boiler, and wherein said fluid medium is water.

8. Temperature changing means as defined in claim 5 in which each device has a maximum capacity insufficient to satisfy the maximum anticipated load, the combined capacity of each of said devices being in excess of the maximum anticipated load; and wherein said control means includes temperature responsive means for continuously operating a sufficient number of said devices to provide a combined output slightly less than that adequate to satisfy the load and for cycling only one of said devices on and off to give a total output sufficient to satisfy said load.

9. Temperature changing means as defined in claim 8 wherein means are provided for controlling each of said devices cycles.

10. A temperature controlling system comprising: a plurality of temperature changing devices; a fluid medium adapted to flow through one or more of said devices; means for conveying said fluid medium to a load; and means for controlling the operation of said temperature changing devices including, a temperature responsive device for each temperature changing device, each temperature responsive device having adjustable means responsive to temperature external of said load for actuating its respective temperature changing device, each of said adjustable means being preset to actuate its respective temperature changing device at a different temperature, and one of said temperature responsive devices having further adjustable means responsive to the temperature of said fluid medium for cycling the temperature changing device associated therewith on and off in response to differences in the temperature of said fluid medium and the setting of said further means, whereby the temperature external to said load determines the number of temperature changing devices to be operated in addition to said one temperature changing device, if any, and each of this number of devices is operating continuously while said one device cycles on and off to retain the temperature at said load substantially constant.

11. A system as defined in claim 10 including primary conduit means for conveying fluid medium to said load; secondary conduit means for each of said temperature changing devices, each having an inlet and outlet communicating with said conduit means; valve means normally closing each inlet; and means in at least some of said secondary conduit means for circulating fluid medium from said primary conduit means through the inlet, the temperature changing device, and back into said primary conduit means through the outlet, the valve means of said temperature changing devices being operatively responsive to the actuation of their respective secondary circulating means to open said valve means and establish a flow path through the temperature changing device.

References Cited
UNITED STATES PATENTS

| Re. 21,569 | 9/1940 | Crago | 236—1 |
| 2,083,612 | 6/1937 | Midyette | 236—1 |
| 2,271,120 | 1/1942 | Grant | 236—11 |
| 2,300,560 | 11/1942 | Faber | 236—1 |
| 2,549,952 | 4/1951 | Wheelock | 236—1 X |

FOREIGN PATENTS 854,151  11/1960  Great Britain.

EDWARD J. MICHAEL, *Primary Examiner*